Nov. 5, 1963
C. R. GIESE
3,109,328
PAPERBOARD CARTON BLANKING DIES AND METHOD OF MAKING SAME
Filed Feb. 6, 1959
4 Sheets-Sheet 1
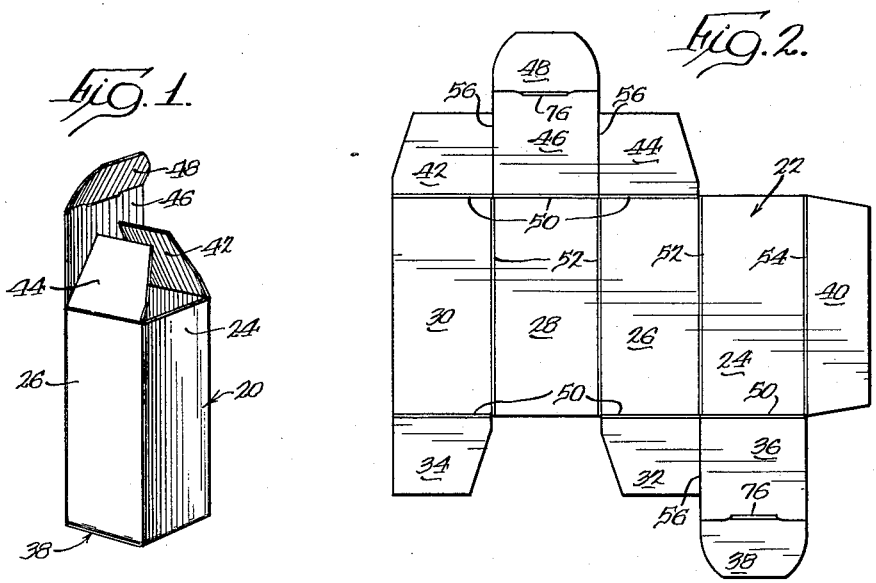
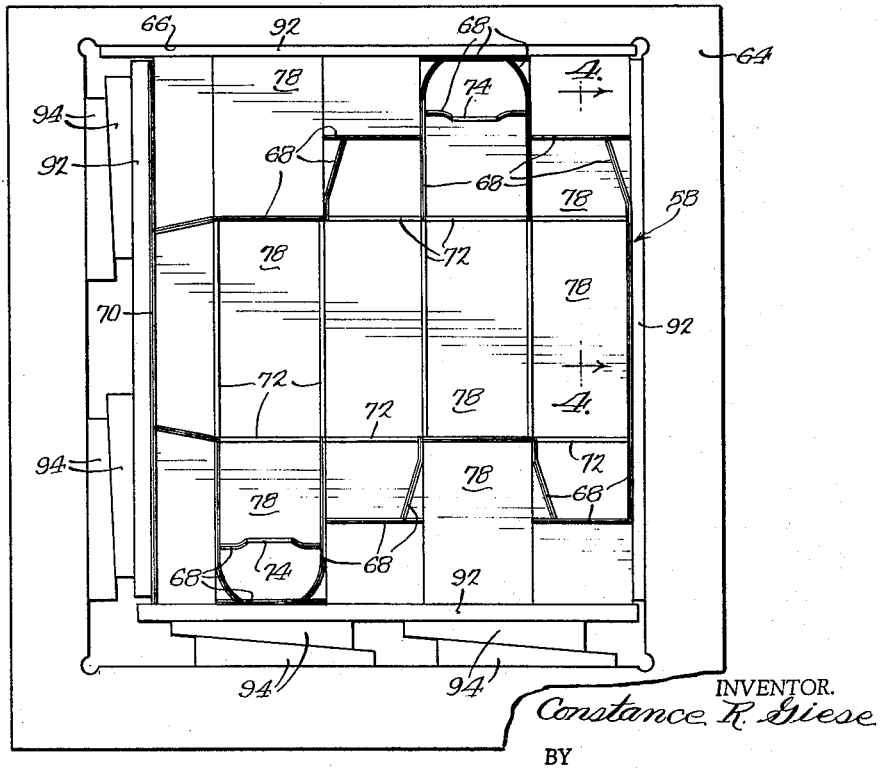
INVENTOR.
Constance R. Giese
BY
Wuppet, Gradolph & Love
Attys.

Nov. 5, 1963  C. R. GIESE  3,109,328
PAPERBOARD CARTON BLANKING DIES AND METHOD OF MAKING SAME
Filed Feb. 6, 1959  4 Sheets-Sheet 2
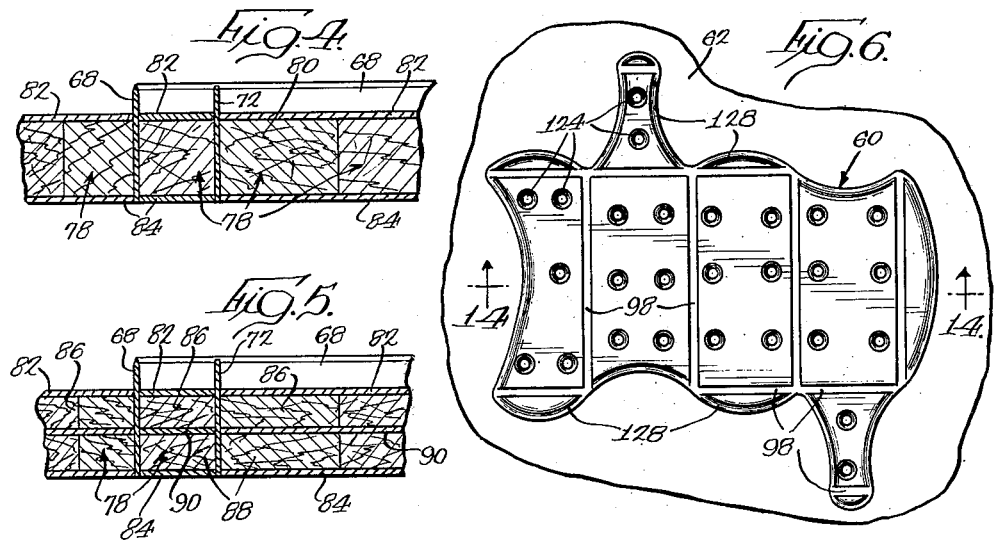
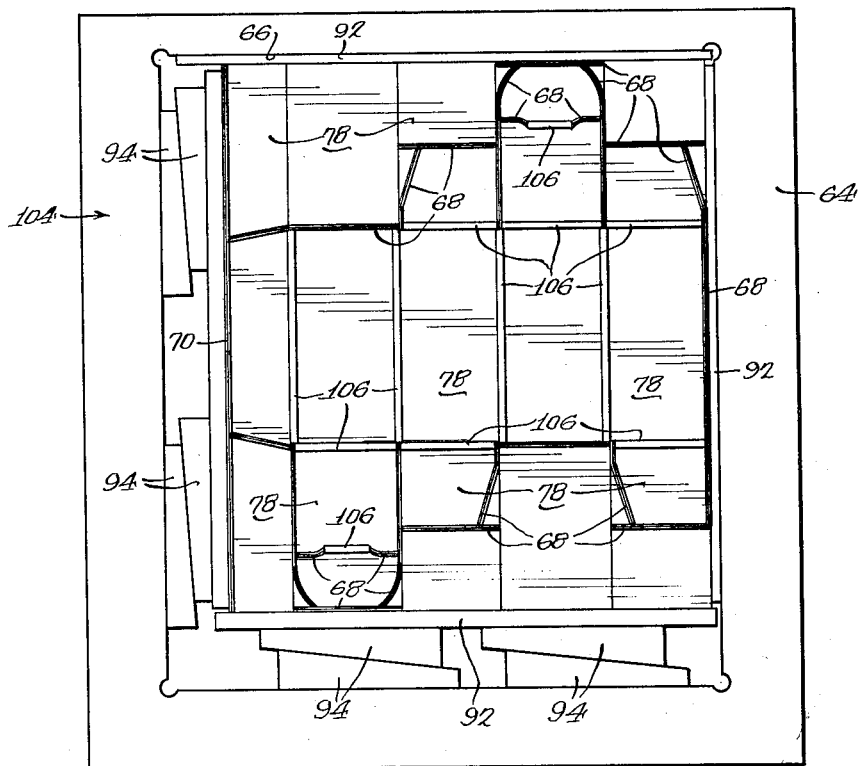
INVENTOR.
Constance R. Giese
BY
Wupped, Gradolph & Love
Attys.

Nov. 5, 1963 C. R. GIESE 3,109,328
PAPERBOARD CARTON BLANKING DIES AND METHOD OF MAKING SAME
Filed Feb. 6, 1959 4 Sheets-Sheet 3
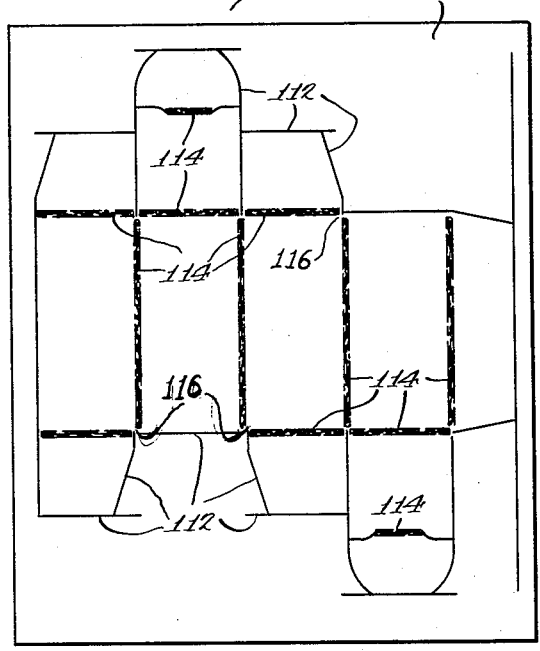
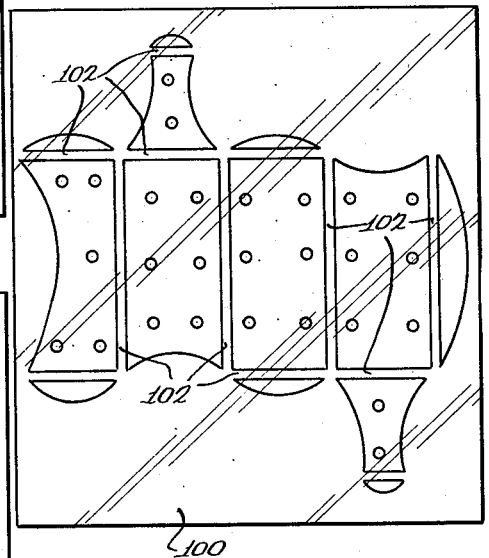
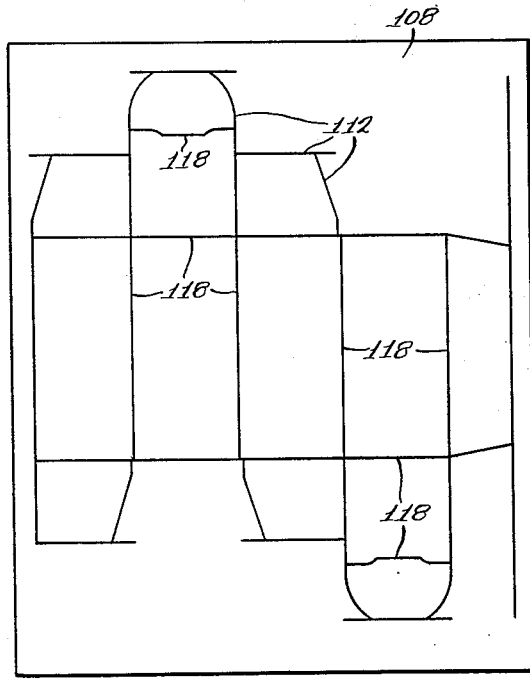
INVENTOR.
Constance R. Giese
BY
Wupper, Gradolph & Love
Attys.

Nov. 5, 1963   C. R. GIESE   3,109,328
PAPERBOARD CARTON BLANKING DIES AND METHOD OF MAKING SAME
Filed Feb. 6, 1959   4 Sheets-Sheet 4
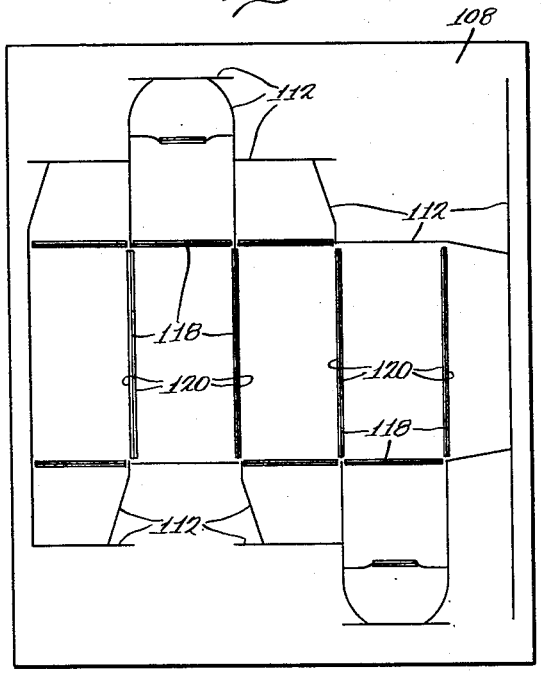
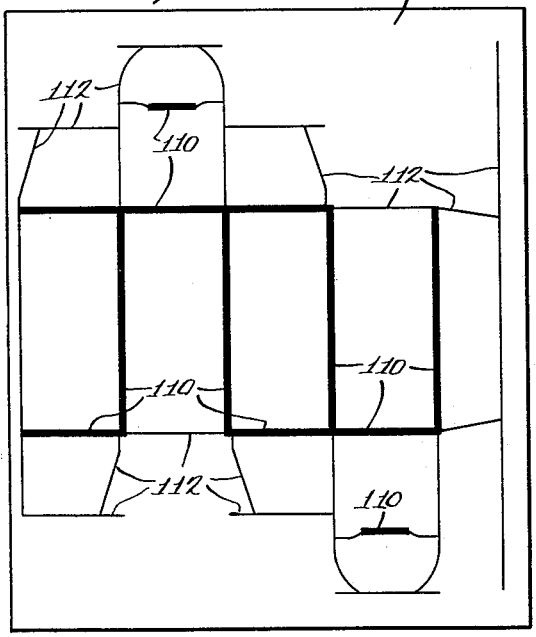
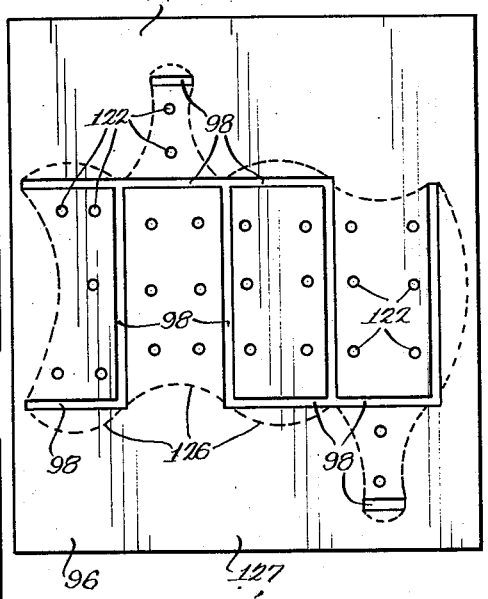
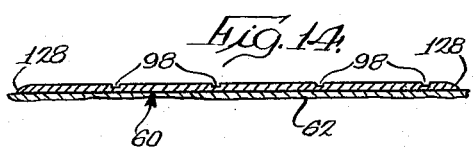
INVENTOR.
Constance R. Giese
BY
Wupper, Gradolph & Love
Attys.

United States Patent Office 3,109,328
Patented Nov. 5, 1963

3,109,328
PAPERBOARD CARTON BLANKING DIES AND METHOD OF MAKING SAME
Constance R. Giese, 3352 W. 83rd St., Chicago 29, Ill.
Filed Feb. 6, 1959, Ser. No. 791,683
4 Claims. (Cl. 76—107)

The present invention relates to cutting and scoring dies for making box carton blanks from paperboard, fiberboard, and the like, and to a new and improved method of making such dies.

Dies for manufacturing paperboard and the like carton blanks comprise a male die and a female die or makeready. The male die is held in a frame and includes properly dimensioned and shaped cutting and scoring rules spaced from each other by spacer blocks and locked in the frame. The frame and die may be cylindrical or flat in accordance with the type of press to be used in the blank making operation. The cutting and scoring or creasing rules are accurately made of tempered steel and are usually spaced one from another by plywood spacer blocks.

The female die or makeready is mounted on a flat or cylindrical cutting plate, depending upon the type of press used. The female die is made by gluing a sheet of fiberboard or the like of appropriate thickness to the cutting plate. A carbon impression of the male die, mounted in the platen or cylinder, is made on the fiberboard sheet. Where the line impression on the fiberboard sheet is taken from a scoring rule, a slot having a width equal at least to twice the carton stock thickness plus the thickness of the rule is cut in the fiberboard sheet. Where the carbon impression is taken from a cutting rule the fiberboard sheet is skived away from the impression line an appreciable distance to permit the cutting die to sever the carton blank stock against the cutting plate.

These dies have several disadvantages. They are expensive, particularly the female die. The fiberboard must be grooved by hand, and it is conventional that this be done with the die in the press so as to insure proper registry between the dies. A highly skilled workman must do the job so that it will be done properly and accurately. This operation takes several hours on a multiple die set, and the "down" time of the press and the expense of the skilled workman add up to a substantial die cost.

A female die made in this conventional manner has a relatively short life, usually less than 250,000 blanks, as the edges of the grooves, being bounded by fiberboard, round and the creases or score lines are not sharp and sufficiently well defined. For a large run of blanks it is usual to make several female dies or makereadys for a single male die. The loss of press time and the high cost of the female dies are obvious disadvantages.

Another disadvantage arises from the fact that changing moisture conditions in the dies can cause them to lose extreme accuracy of registry. With the spacer blocks of the male die made of wood, a change in the moisture conditions of the dies can and does cause an uneven expansion or shrinkage of the wood elements, to cause some, and sometimes not an insignificant, misalignment of the dies.

Attempts have been made to overcome these disadvantages, but most of them have either been unsuccessful or have merely increased the die cost without solving the basic problems.

It is therefore a principal object of the present invention to provide a new and improved carton blanking die set which overcomes the disadvantages of those now in use.

Another object is to provide a novel method of manufacturing the die set referred to in the previous paragraph.

Another object is to provide a new and improved carton blanking die set wherein the cutting and scoring rules of the male die and the grooves in the female die are accurately located in their respective dies by spacing means made at least partially of noncorrosive metal.

Another object is to provide a novel method of manufacturing the female die in a carton blanking die set which does not require that the die be made even partially in the press.

Another object is to provide a novel method of manufacturing the female die in a carton blanking die set which includes the step of photoengraving in a metal plate the grooves corresponding to the scoring or creasing rules.

Another object is to provide a novel method of manufacturing the dies for a carton blanking die set which minimizes the amount of hand work required.

Another object is to provide a new and improved carton blanking die set capable of producing well over 1,000,000 paperboard carton blanks.

Other objects and advantages will become apparent from the following description taken in conjunction with the accompanying drawings, wherein FIG. 1 is a perspective view of a paperboard or fiberboard carton of the type made from a blank cut and scored on the dies of the present invention;

FIG. 2 is a plan view of a cut and scored blank from which the carton of FIG. 1 may be made;

FIG. 3 is a plan view of a single male die used in cutting and scoring the blank of FIG. 2;

FIG. 4 is an enlarged detail cross sectional view, taken along the line 4—4 of FIG. 3, and illustrating a new and improved spacing and separator block for the cutting and scoring or creasing rules;

FIG. 5 is a view similar to FIG. 4, showing a modified form of spacing and separator block;

FIG. 6 is a plan view of a female makeready or die to be used with the male die of FIG. 3;

FIG. 7 is a plan view of a male die wherein the scoring rules have been replaced by the marking or printing rules of this invention;

FIG. 8 is a plan view of artwork taken from the die of FIG. 7, and useful in making the corresponding female die of FIG. 6;

FIG. 9 is a plan view of a negative used in making the female die or makeready through engraving a photosensitive plate;

FIG. 10 is a plan view of a single line impression taken from the male die of FIG. 3 in a first step in making the artwork for the female die or makeready;

FIG. 11 is a plan view of the artwork during a second stage in the preparation thereof;

FIG. 12 is a plan view of the artwork during a third stage in the preparation thereof;

FIG. 13 is a plan view of an engraved photosensitive plate, made by using the film negative of FIG. 9, and indicating in dotted lines where the skiving of the plate is to be made; and FIG. 14 is a cross sectional view of the female die or makeready, taken along the line 14—14 of FIG. 6 looking in the direction of the arrows.

Referring to the drawings, it will be seen from FIGS. 1 and 2 that a paperboard carton 20 may be made from a carton blank 22 shown in flattened condition in FIG. 2. The carton has four walls 24, 26, 28, and 30, a pair of bottom flaps 32 and 34, and a bottom closure 36 with a connected tab 38 which is designed to be tucked against the wall 28. A glue flap 40 is provided on the wall 24 and will be glued or otherwise suitably secured to the inner face of the wall 30. At its upper end the carton blank is formed with top flaps 42 and 44, a top 46, and a tab 48, which is to be tucked between the flaps 42 and 44 and the front wall of the container 24. This is conventional construction, and the flaps 32, 34, 42, 44, and the bottom and top members 36 and 46 are fastened to the main body of the container along score lines indicated generally at 50. Furthermore, the walls 24, 26, 28, and 30, are interconnected along score lines 52 and the glue flap 40 is connected to the wall 24 along a score line 54.

In making this carton blank, a sheet of paperboard or fiberboard is passed between a pair of suitably formed dies and the carton blank is stamped therefrom with the outline of the blank and the cuts between the elements 42 and 46 and 44 and 46, which are indicated by the reference character 56, as well as those between the flap 32 and bottom 36, similarly indicated by the reference character 56, being formed at the same time as the score lines 50, 52, and 54. Thus, when the carton blank 22 is cut from the sheet or web of material passed between the dies, it is ready to be fed into a folding and forming machine and filled with whatever commodity it is designed to contain.

The invention is concerned with the dies which are useful in manufacturing such carton blanks, and with a novel method of making such dies, particularly the female member thereof.

In this specification and in the drawings, there is disclosed but a single box carton blank and a single blank die set. It should be appreciated, however, that in practice it is conventional that for economy of operation, several blanks (sometimes as high as over 100) will be formed with a single press stroke, and that multiple impression dies are encompassed within the limits of the present invention.

In FIGS. 3 and 6 there are shown, respectively, a male die 58 and a female die or makeready 60 useful in making the box carton blank shown in FIG. 2. The male die is of the type adapted to be mounted in a platen and the female die is mounted on a cutting plate 62 in a manner which will be more fully described hereinafter. The cutting plate 62 is adapted to be secured in a press. In this case, the male and female dies 58 and 60, respectively, are of the flat or platen type and are designed for use in a platen press. However, it is to be understood that the techniques and principles of this invention are useful in making dies of the same basic concept for cylinder or rotary presses.

The male die includes a frame 64 having an opening or window 66 in which are mounted a plurality of cutting rules 68 which are positioned so as to form the various elements of the blank shown in FIG. 2. There is included a long severing or cutting rule 70 to separate the blank 22 from the web of material, assuming that the web fed into the dies is no wider than the space between the upper and lower blank limits, or no wider than the space between the edges of the tabs 38 and 48. The rule, therefore, might be indicated as a trimming rule, although it defines the outer edge of the glue flap 40.

Also included in the male die 58 are a number of scoring rules 72 which are adapted to define the score lines 50, 52, and 54, as indicated in the plan view of the blank (FIG. 2). There are a pair of short rules 74 which form the score lines 76 between the tops and bottoms 46 and 36 and the top and bottom tabs 48 and 38, respectively. These are interfitted between a pair of the cutting rules 68 in a manner which is well known in this art.

The cutting and scoring rules heretofore described and indicated specifically by the various reference characters 68 through 74, are positioned within the opening or window 66 in the frame 64 by means of spacer blocks 78. Heretofore it has been conventional to make such spacer blocks of plywood. However, the spacer blocks 78 of the male die of the present invention are preferably made in accordance with the disclosure in FIG. 4 or FIG. 5. Such spacer blocks 78 are made of laminated wood cores 80 having bonded to the front and rear faces thereof metal plates 82 and 84, respectively. The spacer blocks 78 are cut from a larger laminated sheet and fitted into the die in the conventional fashion with the noncorrosive metal plates 82 and 84 being sawed at the same time as the cores 80 thereof. The cores 80 are made of a suitable hard wood, such as cherry, birch, ash, or maple, and it is preferred that the plates 82 and 84 be made of a noncorrosive metal such as stainless steel, aluminum, aluminum alloys, or zinc alloys.

A modified block 78 is shown in FIG. 5, which is in all respects similar to the block 78 of FIG. 4, except that it is formed with a pair of cores 86 and 88, and an intermediate laminated metal or metal alloy sheet 90, in addition to the front and rear plates 82 and 84, respectively.

The use of the metal laminae in the spacer blocks 78 of FIGS. 4 or 5, stabilizes the block size, prevents the moisture from having any appreciable effect upon the spacer block 78, and therefore insures that the scoring and cutting rules 68, 70, 72, and 74, when keyed and locked in position in the frame 64, will remain in position during the use of the die. Furthermore, when the die is removed from the press and stored, these spacer blocks will continue to maintain their stabilizing and moisture control and will assist in preventing the rules from becoming loosened in the frame.

It will be noted that the male die is completed by the conventional lockup furniture 92 and tapered wooden wedge keys or coins 94. The female die or makeready 60 is made of a relatively thin sensitized zinc plate which preferably has a thickness of .025″ up to a thickness of .050″. The thickness of the plate 96 is dictated by the depth of the groove 98 to be formed therein opposite the scoring rules 72 and 74 of the male die. The depth of these grooves depends upon the thickness or the weight of the fiberboard or paperboard stock from which the box carton blanks 22 are to be made. The depth of the scoring grooves 98 will be at least equal to the thickness of the fiberboard stock for the blanks 22, and it has been found that grooves from .015″ to .030″ deep, with the shallower grooves being formed in the thinner plates and the deeper grooves being formed in the thicker plates are practical.

The zinc plate 96 is photosensitive and is exposed through a film 100 which has clear spaces 102 defining the lines which correspond to the scoring grooves 98 in the female die 60. After the plate 96 has been exposed it is engraved in the conventional process well known in the photoengraving art to the groove depth which is required for the particular die 60 under consideration, and which will be a depth ordinarily between .015″ and .030″.

One of the important features of the present invention is the making of the film negative 100 from artwork taken from the male die 58 or its printing counterpart 104 (FIG. 7), which has special printing rules 106 substituted for the scoring rules 72, as will be explained immediately hereinafter. The die of FIG. 7, designated as a printing die, has all of the elements of the male die of FIG. 3, except for the use of printing rules 106 which have been substituted in this die for the scoring rules 72 and 74. The main body of each printing rule 106 equals the thickness of the equivalent scoring rule 72. The printing rule 106 has an exposed surface having a width equal to the width of the scoring rule 72 plus at least twice the thickness of the fiberboard stock from which the carton blanks 22 are to be formed. It is from this printing die 104 that at least the first step in the artwork may be made for making the film negative 100 from which the impression in the sensitized zinc plate 96 is made, as best seen in FIG. 13.

Another type of rule has a scoring rule edge of conventional thickness and a main body and base of a thickness equal to the thickness of the scoring rule edge and twice the thickness of the paperboard stock from which the carton blank 22 is to be manufactured. Such rule is a combined printing and scoring rule. The wide base of such rule would serve as the printing face which is referred to hereinafter.

The final artwork for making the film negative of FIG. 13 is shown in FIG. 12, and is on either a stiff, preferably white, sheet 108, or a correspondingly stiff vinyl sheet. It will be observed from FIG. 12 that there are two sets of lines, the lines 110 having substantial width and corresponding to the scoring rules and the printing rules 106. The lines 110 are exceedingly wide and heavy and solid so as to photograph sharply, and are of a width exactly equal to the width of the grooves 98 in the female die 60. It will also be noted that there are lighter and thinner lines 112 which correspond to the cutting rules 68 of the male die. These lighter lines 112 are sufficiently light so as to not be photographed. Preferably, the lighter lines 112 are physically cut from the sheet prior to photographing, or if they are photographed they may be opaqued out of the negative.

The final artwork, as seen in FIG. 12, may be formed in a variety of ways, preferably made from the printing die 104 as seen in FIG. 7, having the rules 106 mentioned previously herein. By using this die, a sheet of one-time hard carbon is laid over the face of the die, with the carbon surface outward, and the sheet 108 is pressed against it. It may be preferable that there be interposed between the carbon sheet and the die rules another sheet to give support to the carbon paper, so that the latter will not be severed during the impressing operation. In FIG. 8 there is shown the artwork at a stage wherein the lines 112 appear and the lines 110 (which are therein indicated by the reference character 114) appear in a somewhat lighter form but in full width. It will be noted that at the corners where a pair of the rules 106 come together there is a void (indicated at 116) which preferably is later filled in by means of pen and ink. If the carbon is not sufficiently black, it is advisable to go over the lines 114 in order to make certain that they are sufficiently dense as clearly to distinguish them from the lines 112 and to insure that a good impression is available for making the film negative 100. As previously noted, it is the better practice to trim the sheet 108 so as to remove the lines 112.

It is also possible directly to make the solid black lines 110. This is done by covering the exposed surfaces of the printing rules 106 with printer's ink, thereby taking the impression directly onto the white sheet 108 by pressing such sheet against the printing die 104. Under these circumstances no intermediate carbon or transfer sheet would be used, but the sheet 108 would be pressed directly against the exposed surfaces of the rules 68 and 106. Any irregularities are readily touched up by means of pen and carbon ink.

Still another way to make the artwork in FIG. 12 is to take an impression by means of the carbon transfer process directly from the male die 58 (FIG. 3). This would be taken preferably onto the white sheet 108 and it will be noted from FIG. 10, which pictures such carbon impression, that the lines 118 which are made by the scoring rules 72 and 74 have the same thickness or weight as the lines 112 made by the cutting rules. The added width for the lines 118, to give them the width and density of the lines 110, may be done in either of two ways.

A first way is indicated in FIG. 11, which shows that the lines 118 have been bounded by a pair of parallel lines 120. The bounding lines 120 dictate the width of the final artwork lines 110, and will be spaced apart a distance equal to the width of the scoring grooves 98 in the female die 60. This drawing must be done carefully with a pen, and this width is calculated on the basis of the width of the scoring rule plus at least twice the thickness of the paperboard stock from which the blank 22 is to be formed. When the bounding lines 120 have been drawn, then the area between them may be filled in with black drawing ink in order to make the artwork shown in FIG. 12.

Still another way of transforming the single line impressions of FIG. 10 into the artwork of FIG. 12, is to overlay the lines 118 with dense black strips of a proper width, centered on the lines 118. The width of such strips is equal to the thickness of the scoring rules 72 plus at least twice the thickness of the paperboard stock from which the blank 22 is to be formed. The strips would have a black outer face and an adhesive on their opposite face, which would be used to adhere them to the sheet 108.

After the artwork of FIG. 12 has been completed, it can be provided with a number of black dots which will photograph as clear dots 120, as seen in FIG. 9. These dots correspond to depressions 122 etched in the plate 96 and to drilled holes 124 in the finished female die. These holes 124 are for the purpose of permitting the glue used to hold the female die to the cutting plate to be expressed so that the cutting die will lie smoothly on the cutting plate.

After the sensitized plate 96 has been exposed and etched to form the grooves 98 and the dot depressions 122, it is cut away from the dotted line 126. In using the negative of FIG. 9, an area 127 on the plate 96 will be etched outside the dotted line 126 to the same depth as the grooves 98 and the dots 122. The plate 96 will be cut with a jigsaw or scroll saw along the line 126, and the edge of the plate will be skived or tapered at 128 (FIGS. 6 and 14) to provide clearance for the cutting rules 68 which press the paperboard stock against the cutting plate 60 to sever it along the indicated lines. This cutting and skiving usually is done manually and the dotted line 126 merely indicates where it will be done in the particular female die 60 illustrated in this case.

The depressions 122 will be drilled through the plate 96 to define the bore and countersunk holes 124 for the glue to be expressed therethrough in order that the female die 60 lie evenly on the cutting plate 62.

In order to locate the female die 60 on the cutting plate 62 it is preferred that the male die be mounted in the press platen (not shown) in the position in which it is to be used. Opposite the male die a thin folio sheet of paper is glued over the cutting plate, and a carbon impression of the scoring and cutting rules from the male die 58 is made on this paper overlay. The back face of the female die 60 and the folio sheet are coated with adhesive, and the female die is laid over the impression of the male die. The female die is readily positioned by lining up the center lines of the scoring rule grooves 98 with the corresponding lines of the impression taken from the male die 58. It may be necessary that these impression lines be extended for the artisan more accurately to position the female die in position.

Extreme accuracy in locating the female die is effected by inserting a sheet of paperboard blank stock between the dies 58 and 60 and slowly closing the press before the adhesive has set. Any minor misalignment of the dies 58 and 60 will be corrected by the scoring rules 72 and 74 forcing the paperboard stock into the corresponding female die grooves 98, thereby to shift the female die on the folio sheet and the cutting plate 62 laterally until the scoring rules are aligned with the scoring grooves.

Where the folio sheet extends beyond the female die 60 it preferably is removed in order that the cutting plate 62 be exposed to the action of the cutting rules 68.

It has been found that the life of the female die 60 can be appreciably extended by chromium plating it.

The specific dies shown and described herein are related to solid paperboard or fiberboard. It is to be understood that the dies and techniques disclosed herein with appropriate changes as to size and stock thickness are applicable to the art of blanking corrugated board for box cartons.

From the foregoing description, it will be appreciated that the objectives which were claimed for the present invention at the outset of the specification have been fully attained.

While preferred embodiments of the carton blank forming die set and the novel method of making them constituting this invention have been shown and described, it will be apparent that numerous further modifications and variations thereof may be made without departing from the underlying principles of the invention. It is, therefore, desired by the following claims to include within the scope of the invention all such variations and modifications by which substantially the results of this invention may be obtained through the use of substantially the same or equivalent means.

What is claimed as new and desired to be secured by United States Letters Patent is:

1. The method of making on a photosensitive plate a female die of a male-female box carton blanking die set from an impression taken from the male die of the set, comprising, setting up said male die with at least dummy rules wherever the cutting and scoring rules would be located, taking a line impression of said rules and emphasizing said impression so that the width of the lines indicating scoring rules is equal to the thickness of the rules plus at least twice the thickness of the paperboard stock from which the carton blanks are to be formed, making a film negative of said wider lines to represent the scoring rules, exposing said photosensitive metallic plate through said negative, developing and etching said plate to form grooves therein corresponding to said wider lines, skiving away the remainder of the plate to permit the cutting rules to move therepast when said die plate is mounted in a press in registry with said male die, locating said grooved and skived plate on a cutting plate by pressing a blank between said male die and said grooved and skived plate while said grooved and skived plate is permitted to shift into a position of registry with said male die and then securing said grooved and skived plate to said cutting plate.

2. The method of making on a photosensitive plate a female die of a male-female box carton blanking die set from an impression taken from the male die of the set, comprising, setting up said male die with printing rules wherever the scoring rules would be located, taking an impression from said printing rules, making a film negative of the lines representing said scoring rules, exposing said photosensitive metallic plate through said negative, developing and etching said plate to form grooves therein corresponding to said scoring rule lines, and thereafter pressing a blank between said male die and said plate while said plate is permitted to shift into a position of registry with said male die.

3. The method of making on a photosensitive plate a female die of a male-female box carton blanking die set from an impression taken from the male die of the set, comprising, setting up said male die with printing rules wherever the scoring rules would be located with each of said printing rules having a printing face, inking said printing faces, taking an impression from said inked faces of said printing rules, making a film negative of the inked lines representing said scoring rules, exposing said photosensitive metallic plate through said negative, developing and etching said plate to form grooves therein corresponding to said inked scoring rule lines, and thereafter pressing a blank between said male die and said plate while said plate is permitted to shift into a position of registry with said male die.

4. The method of forming a female die comprising a photosensitive sheet to be grooved and placed in registry with the scoring rules of a male die for use in creasing box carton blanks, the improvement comprising the steps of forming a photographic reproduction of said scoring rules on a light sensitive plate, together with desired clearance dimensions, exposing said light sensitive plate to said reproduction for registering areas susceptible to etching on said plate and conforming to said rules, etching said plate to form grooves in said areas, and thereafter pressing a blank between said male die and said plate while said plate is permitted to shift into a position of registry with said male die.

References Cited in the file of this patent

UNITED STATES PATENTS

| | | |
|---|---|---|
| 1,766,426 | Casto | June 24, 1930 |
| 2,458,867 | Messersmith | Jan. 11, 1949 |
| 2,495,221 | Berlin | Jan. 24, 1950 |
| 2,685,805 | Baumgartner | Aug. 10, 1954 |
| 2,743,629 | Pellegrino et al. | May 1, 1956 |
| 2,826,968 | Phillips | Mar. 18, 1958 |
| 2,830,899 | Brown | Apr. 15, 1958 |
| 2,865,235 | Phillips | Dec. 23, 1958 |
| 2,885,933 | Phillips | May 12, 1959 |